Aug. 16, 1960 H. W. JONES 2,949,199
CONTAINERS FOR SELF-LOADING VEHICLES
Filed July 14, 1955 5 Sheets-Sheet 1
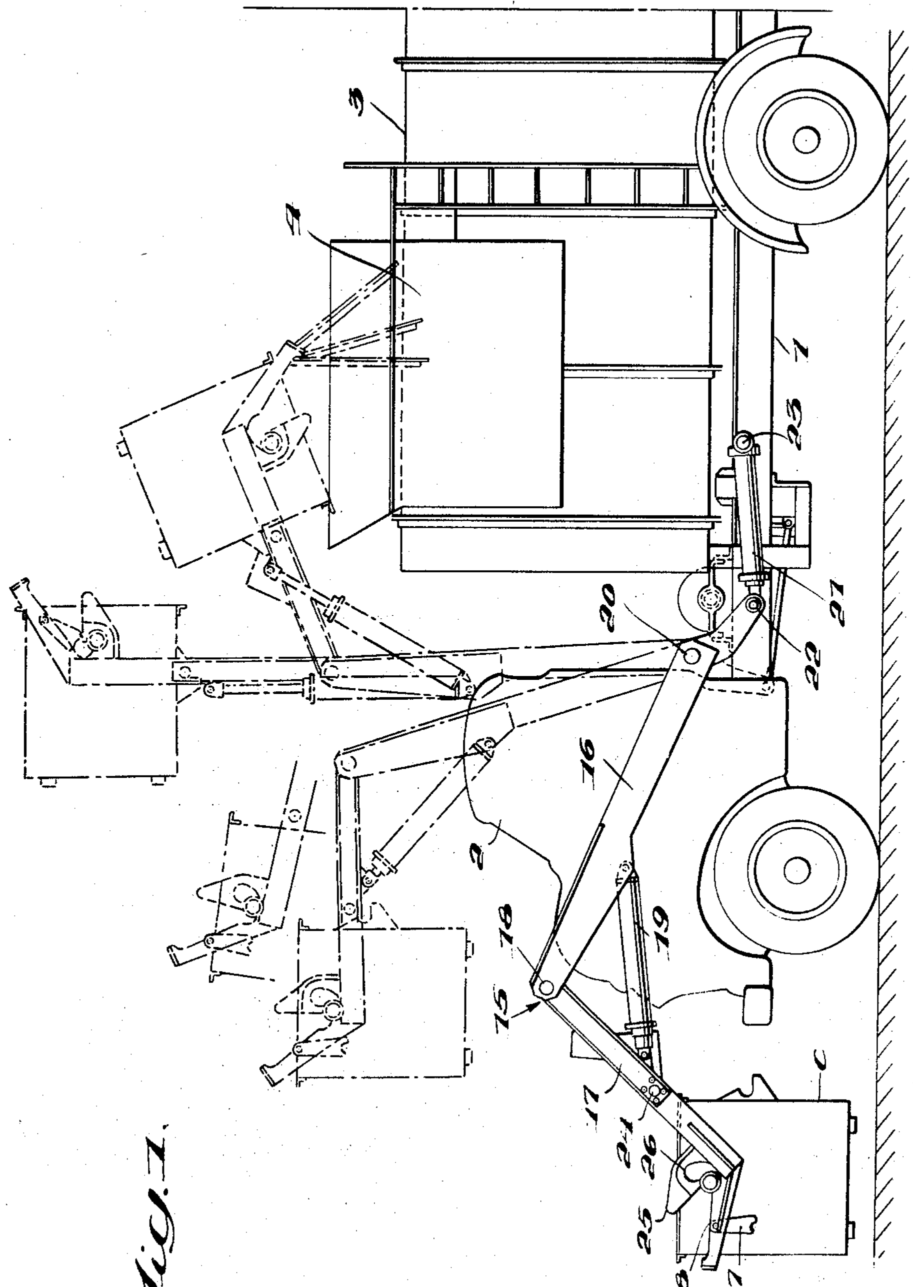
INVENTOR
HARRY W. JONES,
BY Semmes & Mathis
ATTORNEYS Aug. 16, 1960 H. W. JONES 2,949,199
CONTAINERS FOR SELF-LOADING VEHICLES
Filed July 14, 1955 5 Sheets-Sheet 2
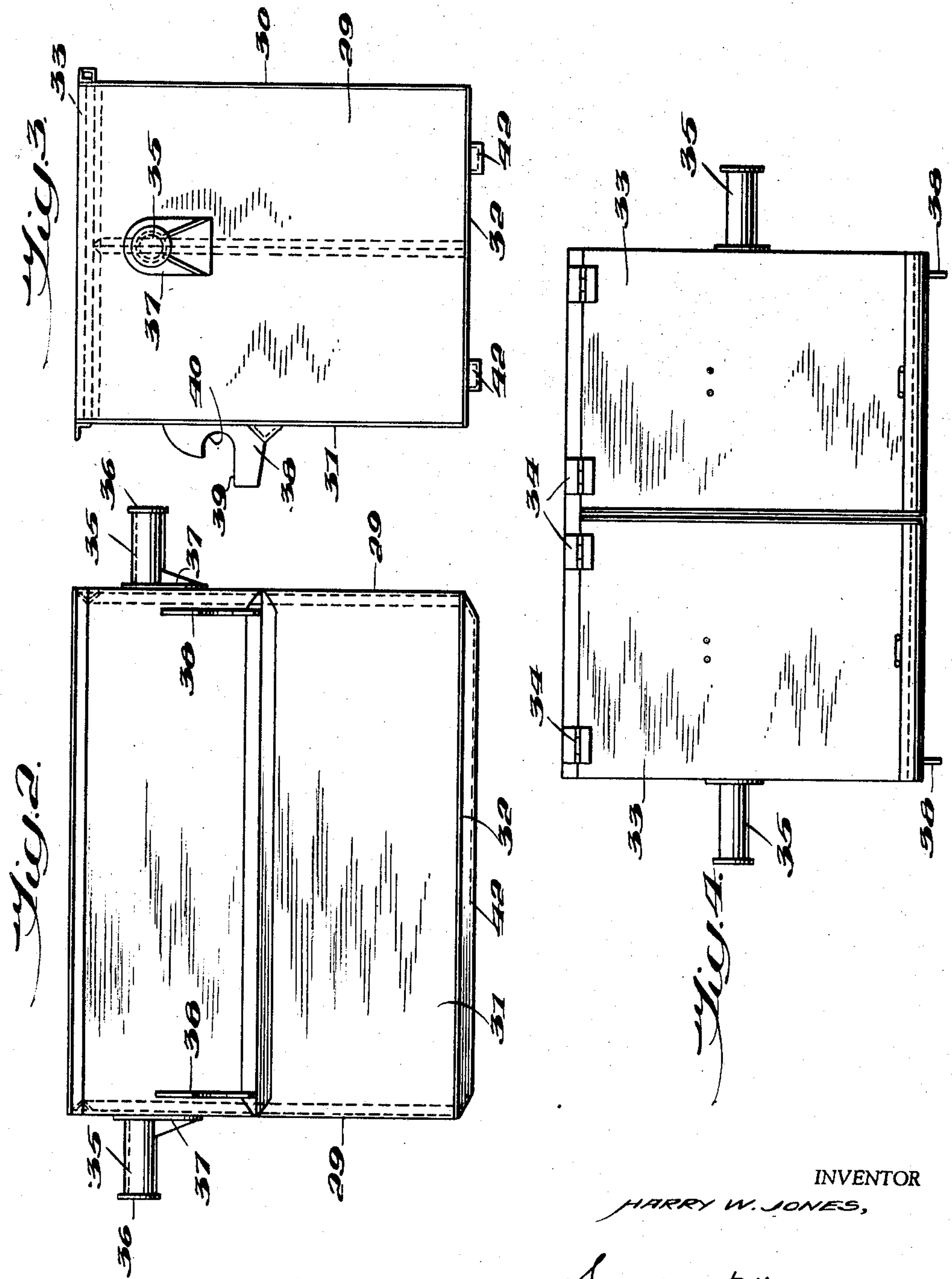
INVENTOR
HARRY W. JONES,
BY Smeckler & Mathis
ATTORNEYS Aug. 16, 1960 H. W. JONES 2,949,199
CONTAINERS FOR SELF-LOADING VEHICLES
Filed July 14, 1955 5 Sheets-Sheet 3
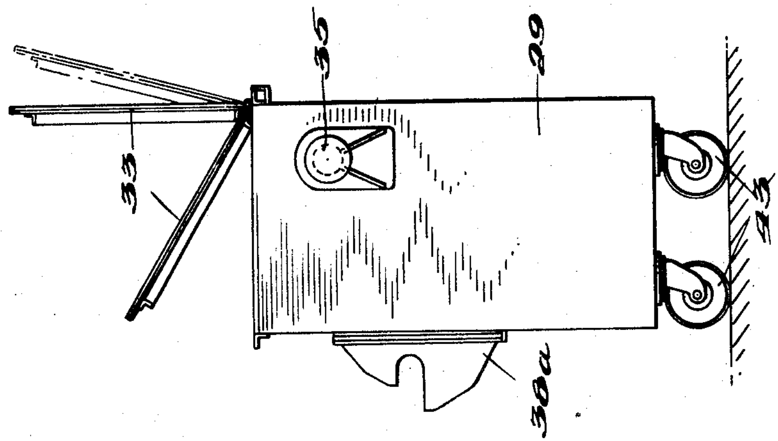
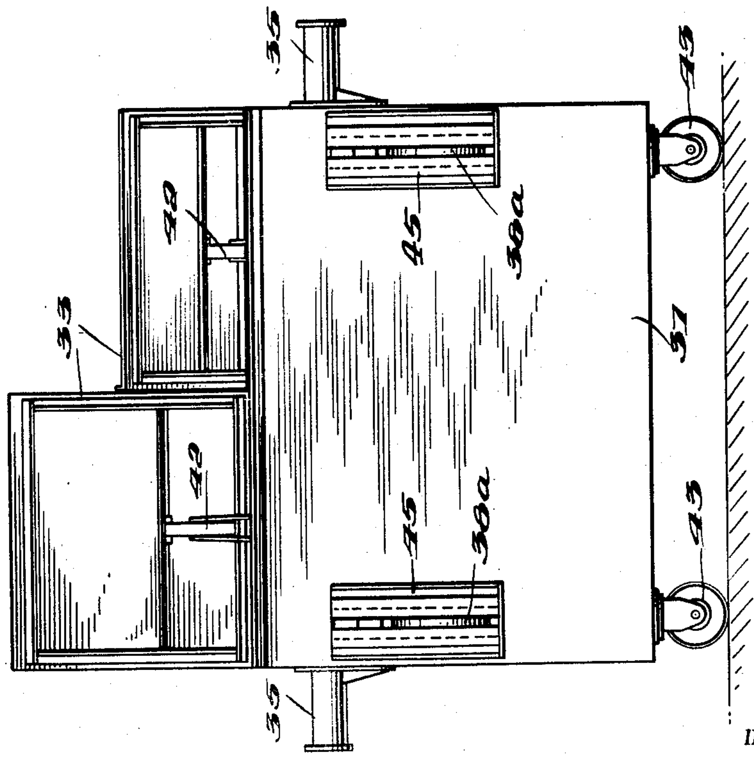
INVENTOR
HARRY W. JONES,
BY Smalley & Mathis
ATTORNEYS CONTAINERS FOR SELF-LOADING VEHICLES
Filed July 14, 1955 5 Sheets-Sheet 4
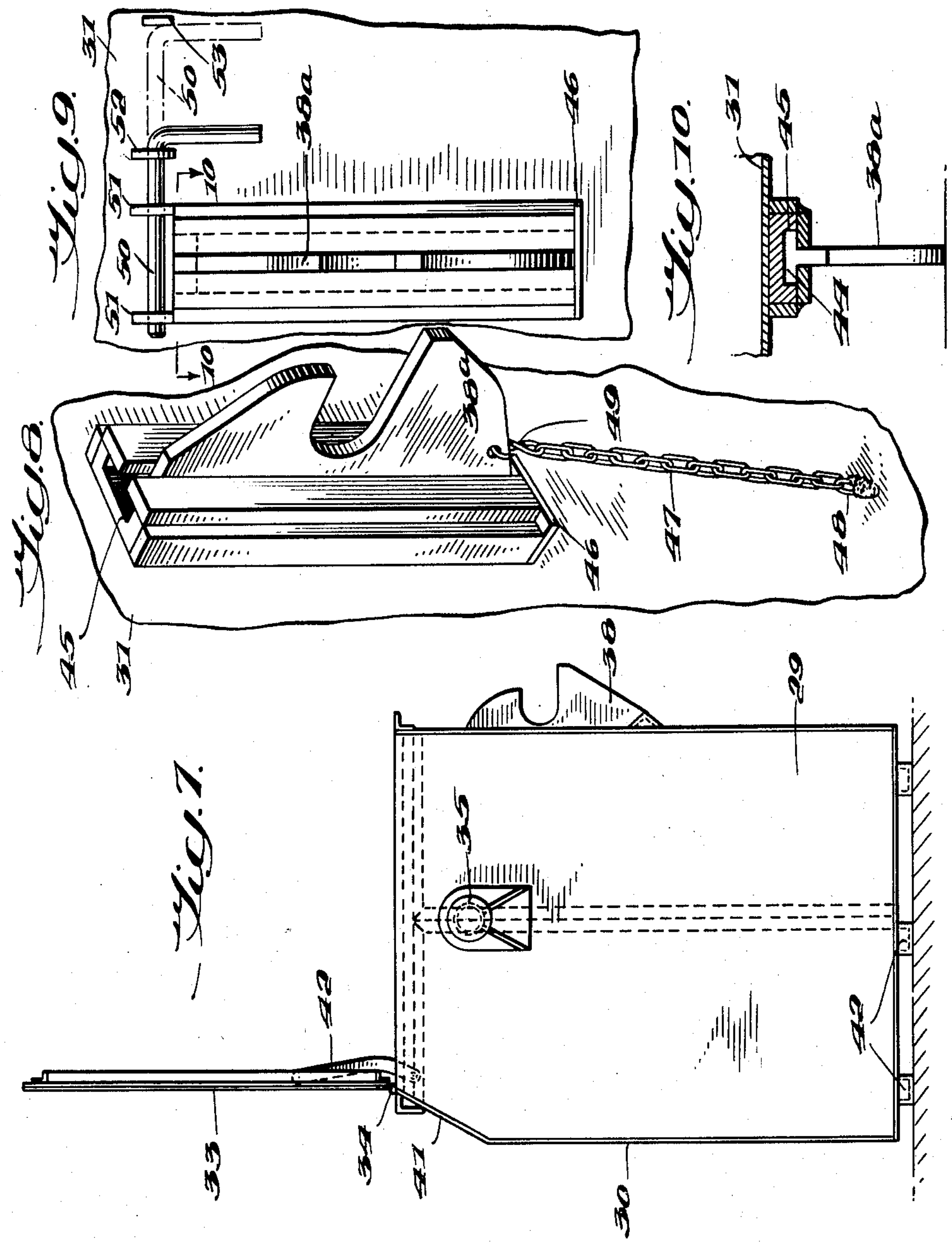
INVENTOR
HARRY W. JONES,
BY Smith & Mathis
ATTORNEYS CONTAINERS FOR SELF-LOADING VEHICLES
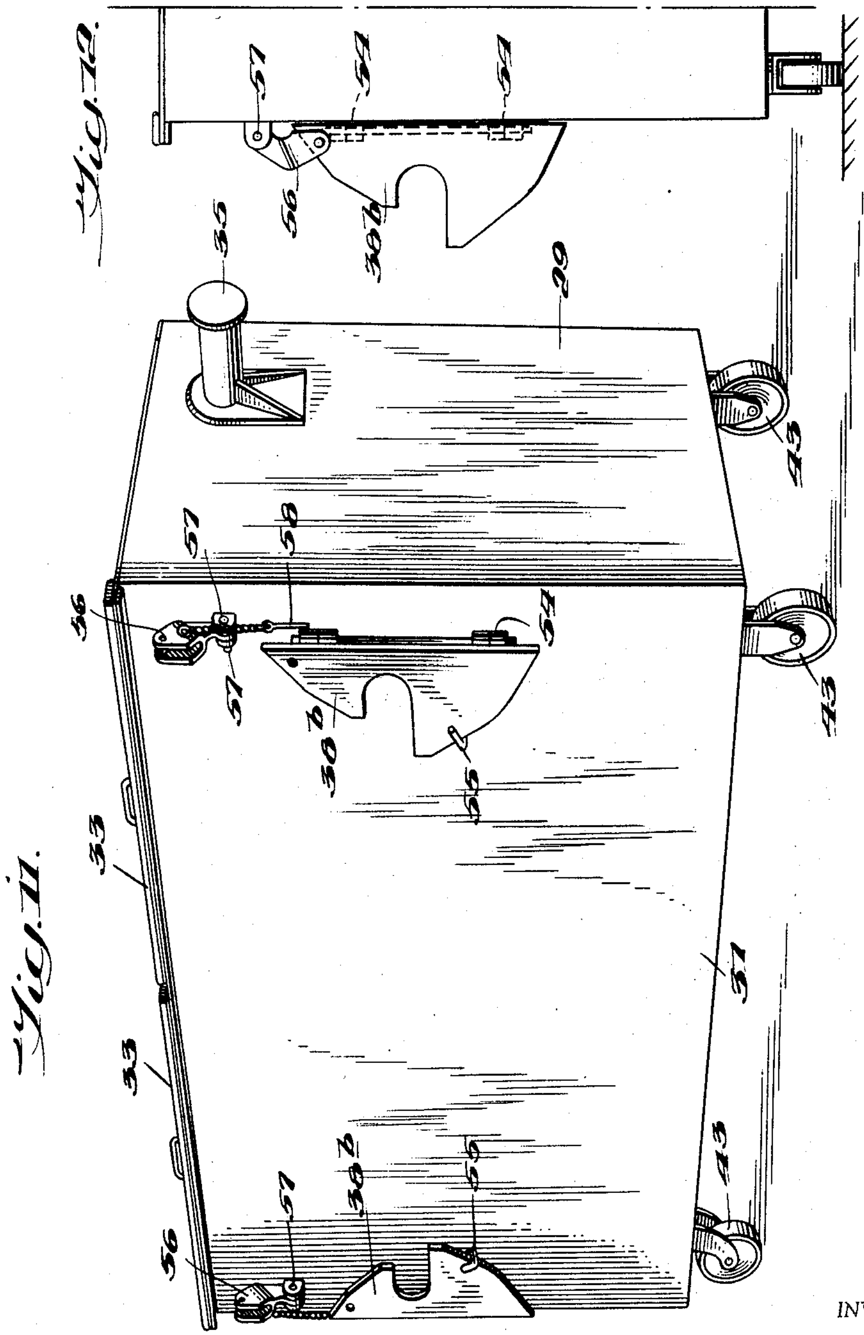
INVENTOR
HARRY W. JONES,
BY Shoemaker & Mattare
ATTORNEYS United States Patent Office 2,949,199

Patented Aug. 16, 1960

2,949,199

CONTAINERS FOR SELF-LOADING VEHICLES

Harry W. Jones, Knoxville, Tenn., assignor to Dempster Brothers, Inc., Knoxville, Tenn., a corporation of Tennessee Filed July 14, 1955, Ser. No. 522,043

13 Claims. (Cl. 214—302)

This invention relates to improvements in containers for self-loading vehicles, and more particularly to vehicles of the type used for the collection of refuse, such as garbage, trash and the like.

Such vehicles are usually provided with a body adapted for containing refuse having a hopper or opening in a top thereof into which the refuse may be dumped from a suitable container, and frequently means is provided in the vehicle for compacting the refuse therein as it is dumped into the body.

Vehicles of this type have been proposed heretofore for dumping into the body material collected in a container by lifting the container at the front of the vehicle and swinging it on articulated arms so as to discharge into the body. Such containers as have been proposed for use with vehicles of the type described have not been entirely practical, nor have they fulfilled desirable results in the operation of such dumping means.

One object of this invention is to improve the construction of containers for this purpose, to provide separable containers which may be filled with refuse separate and apart from the vehicle and then automatically engaged by the articulated arms thereof, for dumping into the body.

Another object of the invention is to provide on the containers facilities for automatic engagement by the articulated arms, both for lifting the container and to insure of positive tilting or turning of the container with respect to the articulated arms for effective discharge of the contents therefrom, and even without spilling any liquid contained in the refuse, as is often the case.

Another object of the invention is to provide one or more dumping brackets or lugs on the container in position to be engaged by the hoisting means for turning the container upside-down with respect thereto in a dumping position for accomplishing an effective discharge of the contents therefrom into the body of the vehicle automatically during the swinging of the arms to an elevated position.

A still further object of the invention is to provide for the collapsing or removal of the dumping bracket or brackets on the container to reduce the overall width thereof, as, for instance, to permit the container to be moved through narrow doorways or halls, and provisions are made also to insure against loss of the dumping bracket or brackets when they are removed from the container.

These objects may be accomplished, according to certain embodiments of the invention, by the provision of a container of the tilt-type, the body of which is made solid throughout and is adapted to be turned upside-down or tilted for dumping the contents therefrom. Such a container is frequently provided with lids for closing the top thereof and which may be spring pressed when moved to open positions, and will open automatically when the container is inverted in a dumping motion.

Lifting pins are provided on opposite ends of the container, adapted to be engaged by the lifting arms of the hoisting mechanism. Preferably, such lifting pins are located above the center of weight of the container and its contents, for suspending the vehicle in an upright position on the arms. The container may be mounted on casters to facilitate rolling, as, for instance, in moving it into and out of buildings, or to other positions where it is at rest for the collection of refuse therein.

One or more dumping brackets are provided on the container to facilitate the discharge of the contents therefrom when the container is elevated. Such bracket or brackets usually project laterally of a side wall of the container, and where more than one bracket is used, they should be located at or adjacent opposite ends of the container. Provision is made for confining the overall width of the container structure, either by the removability of the brackets or the folding thereof against the adjacent side of the container, especially when the container is to be moved into and out of narrow doorways or halls. In the event of the removability of the brackets, adequate provisions are made to insure of accidental disengagement of the brackets from the container, either by chains to confine them securely on the container or by pins to lock them in place.

These embodiments of the invention are set forth in the accompanying drawings, in which:

Fig. 1 is a side elevation of a dumping vehicle having hoisting means and a container, and showing the latter by dotted lines in several positions with respect to the vehicle;

Fig. 2 is a side elevation of a dumping container, illustrating one embodiment thereof;

Fig. 3 is an end elevation thereof;

Fig. 4 is a top plan view thereof;

Fig. 5 is a side elevation of a modified form of container;

Fig. 6 is an end elevation of the form shown in Fig. 5;

Fig. 7 is an end elevation showing a further modified form of container;

Fig. 8 is a detail view of a modified form of dumping bracket detachably mounted on the container, with one form of means for locking the bracket in place;

Fig. 9 is a front elevation of a portion thereof, showing a modified form of locking means;

Fig. 10 is a detail horizontal section therethrough on the line 10—10 in Fig. 9;

Fig. 11 is a perspective view of another form of container, showing a modified form of bracket mounting; and Fig. 12 is an end elevation thereof, with the brackets outturned and secured.

Referring to the dumping vehicle, as illustrated in Fig. 1, the invention is shown in connection with a vehicle of the general type using an articulated arm elevating mechanism, substantially as set forth in the patent of James E. Owen, No. Re. 23,166, granted November 8, 1949. The hoisting mechanism is used, however, in connection with a detachable container that may be filled separate from the hoisting mechanism and then elevated thereby for dumping into the body of the vehicle.

As illustrated in Fig. 1, the vehicle chassis is designated generally by the numeral 1, being of the usual power-operated, self-propelled vehicle having a cab section 2 at the front thereof, which usually encloses the driving engine. A body is shown at 3, which is of the type having a hopper 4 at the front end thereof adapted to receive the refuse when the container is in the dumping position, as shown in dotted lines in Fig. 1. The body 3 may be provided with means for compacting the refuse therein, as is well understood in this art.

The hoisting mechanism is of the type set forth more in detail in the aforesaid Owen patent, No. Re. 23,166. This type of hoisting mechanism comprises a pair of articulated arms 15 mounted at opposite sides of the vehicle. Each of the articulated arms 15 comprises a lifting arm 16 and an arm extension 17 pivoted together at 18, adapted for relative swinging motion to the several positions indicated in dotted lines in Fig. 1. These arms 16 and 17 are connected together also by a hydraulic power device, generally indicated at 19, which, upon relative movement of the piston with respect to the cylinder thereof, causes a folding of the arm extension 17 relative to the lifting arm 16 of each articulated unit 15. The lifting arm 16 is pivotally supported at 20 on the chassis frame 1 intermediate the length of said lifting arm. A hoisting unit 21 is pivotally connected at 22 with the extreme rearward end of the lifting arm 16, and is mounted at 23 on the chassis frame 1. Thus, operation of the hydraulic power device 21 will cause swinging movement of the lifting arm 16 to the different positions indicated in Fig. 1, with respect to the chassis frame 1, and, if desired, the hydraulic power device 19 may be moved at the same time or separately, to accomplish relative swinging movement of the arm extension 17 with respect to the lifting arm 16 of each articulated arm 15, as also indicated in dotted lines in Fig. 1. These power devices 19 and 21 are preferably double-acting hydraulic power devices and are controlled in suitable manner from provisions within the cab 2.

The arm extensions 17 are spaced apart on opposite sides of the vehicle and are adapted to receive a container therebetween. However, these arm extensions are provided with a spacing connector 24, in the form of a bar extending transversely between the respective arm extensions 17, intermediate the length thereof.

At the forward end of each arm extension 17, a hook member, generally indicated at 25, is provided, having a fork-shaped recess therein, as indicated at 26, and which recess may be closed by a latch plate 27 pivoted at 28 on the hook member 25, when the arm extensions 17 are moved to the extreme upper and righthand positions, as indicated in dotted lines in Fig. 1.

The hoisting unit described above is adapted for use with a container which is detachable from the hoisting unit and is capable of being dumped into the hopper 4 of the body 3. This container is indicated at C in Fig. 1 and is described more in detail in connection with Figs. 2 to 10. Several forms of container, and of the bracket structure thereon, are described and illustrated in the drawings.

Referring to Figs. 2 to 4, the container is provided with opposite end walls 29 and with opposite side walls 30 and 31, respectively. The form of container shown has an enclosed body of the tilt-type, being closed at the bottom and requiring tilting of the container for discharge of the contents therefrom. The lower portion of the container is sealed so that it will retain liquids therein. It may be formed as by welding of plates forming the several sides and ends and with a closed bottom, as indicated at 32.

The container preferably is closed at the top by one or more lids, generally indicated at 33, hinged to the body of the container at 34. Two lids are shown in Fig. 4, although one may be used, if desired.

At the opposite ends of the container, lifting pins are secured on the end walls, as indicated at 35. These lifting pins 35 project out from the respective end walls 29 sufficiently to be engaged by the forks 25 of the hoisting mechanism as the vehicle is moved into proximity with the container, for support of the container on the vehicle and for dumping into the hopper 4 of the body 3. Each lifting pin 35 is formed preferably of a tubular section having a flange 36 on the outer end thereof and is carried by a mounting plate 37 that is welded or otherwise secured rigidly to the adjacent end wall 29. The forks 25 engage the cylindrical sections of the lifting pins inwardly of the flanges 36, and the latter hold the forks in place against endwise displacement with respect to the container.

The rear wall 31 of the container body is provided with one or more dumping brackets thereon, to facilitate upset of the container when it is raised by the hoisting means to an elevated position over the hopper 4. Such bracket or brackets are adapted for coaction with the connector bar 24, in this form of the invention, for tilting the container to a dumping position. While an angle bar welded to the wall 31 may be used for the purpose, other forms of brackets are illustrated in the drawings and are preferably used.

In the embodiment of the invention shown in Figs. 2 to 4, the brackets are indicated at 38 and are shown in the form of plates having their inner edges welded or otherwise secured rigidly to the adjacent rear wall 31 of the container. Each of the brackets preferably should be of an angular section, with a ledge portion 39 to fit under the connector bar 24 as the container is elevated, and may be provided also with a recess, as indicated at 40, to facilitate holding of the container in place when it is turned upside-down in its dumping position.

The body of the container may be made of various widths, some of which are illustrated in Figs. 3 to 7, and the capacity of the container will vary according to the width and relative height thereof. For instance, where the container is to be moved through relatively narrow openings, such as doorways or narrow halls, it may have a section substantially as indicated in Fig. 6, or if greater capacity be required, it may have substantial width, as indicated in Figs. 3 and 7. It is preferred that the lids 33 should not have too great overall length, which would interfere with the dumping of the container. In that event, the hinges 34 are preferably located at the upper edge of an inclined section 41 on the front wall 30 of the container (Fig. 7).

The lids 33 are also so constructed and mounted that when they are closed they will stay closed by their own weight. However, they are provided preferably with spring-pressed lifting means, generally indicated at 42 in Figs. 5 and 7, so that the lids will remain open when they have been moved to the open positions indicated therein. Moreover, when the container is in dumping position, as shown at the extreme right in Fig. 1, the lids open automatically and form a definite shield to carry the material into the hopper 4 of the body. Then, when the container is returned to its lowered position at the left in Fig. 1, the lids will be closed by gravity. The spring means of the assembly 42 is so balanced as to tend to hold the lids in an extreme position, but requires very little gravity action to overcome the spring tension thereon.

The container may be supported on runners or reinforcing bars at the bottom, as indicated generally at 42 in Figs. 2, 3 and 7, although, when the container is to be moved by a rolling action, casters may be provided thereon, as indicated at 43 in Figs. 5 and 6. Such casters or other bearing supports will facilitate the pushing of the container through doorways into buildings and to other positions where it may be desired to stand the container for receiving refuse therein.

While the container is shown and described above as having the dumping brackets 38 rigidly secured to the front wall 31 of the container, provisions may be made for detachably mounting these brackets thereon or for folding them, as indicated in Figs. 5, 6 and 8 to 11. This would reduce the overall width of the container, especially when it is to be moved into or through narrow passages.

The dumping brackets may be detachably mounted, as indicated particularly in Figs. 8 to 10. As shown therein, each of the dumping brackets, here designated as **38*a*, is provided with a flanged inner edge, as indicated at 44, slidably received in a dovetailed channel 45 secured to the adjacent side wall 31 of the container. The channel or guideway 45 is open at the top and is closed at the bottom as by means of a plate 46 shown in Fig. 8. Thus, the flange 44 on the dumping plate 38*a* may be inserted into the channel or guideway 45 at the top and will slide downwardly therein into engagement with the closing plate 46** which will thereby confine the dumping bracket with respect to the container.

Provision may be made for securing the dumping bracket against accidental slipping out of the guideway 45. One form of means for this purpose is shown in Fig. 8 as comprising a chain 47 secured at 48 to the front wall 31 of the container and at 49 to the dumping bracket 38*a*. The connection 49 may be in the form of a hook which may be opened to facilitate disconnection of the chain therefrom for removal of the dumping bracket, or the connection at 48 may be detachable for that purpose, as desired.

Another form of means for detachably holding the dumping bracket 38 in place is shown in Fig. 9. In this form, a pin is indicated at 50 slidably mounted through ears 51 on the upper ends of the dovetailed guide 45 and through an ear 52 on the back wall 31 of the container. Normally, the pin 50 will be in the position shown in Fig. 9, directly over the flange section 44 of the dumping plate, but when it is withdrawn to the dotted line position shown in Fig. 9, the dumping bracket 38*a* may be removed from the guide on the container. The pin 50 is L-shaped, with a depending handle portion. A stop lug is shown at 53 on the wall 31 of the container to limit the withdrawing movement of the pin and to prevent it from slipping entirely out of the guiding ears.

The containers provided for the dumping mechanism may be made sufficiently sturdy to facilitate handling by the hoisting and dumping mechanism, and yet are sufficiently simple that they may be moved manually to different positions where they may be filled. The construction of the container enables the hoisting unit to engage automatically therewith by engagement of the lifting pins on the ends of the container; and by the provision of the dumping brackets thereon, the container will be turned to an inverted position to discharge the contents thereof automatically into the hopper 4 of the body, as indicated in the several dotted line positions in Fig. 1.

This rough handling of the container, both in picking up and in dumping, subjects the structure to tensions which nevertheless are adequately compensated for by the structure provided and insures that the container will withstand all of the forces involved therein. The brackets and lifting pins will effectively accomplish a dumping by a tipping over of the container to discharge the contents, even though liquids be contained in the refuse deposited in the container.

The detachable mounting of the brackets enables these to be removed, either for use of the same brackets on other containers, or for reducing the overall width of the container during passage into or through narrow openings, such as doorways or halls.

This result may be accomplished also by folding the brackets in the manner illustrated in Fig. 11. As shown therein, the bracket here designated at 38*b* is hinged at 54 to swing from an outturned position at right angles to the rear wall 31 to a folded position flat against said rear wall. When folded, the bracket 38*b* is retained by a catch 55, and yet when it is in its outturned position, the bracket 38*b* is held in such relation by a yoke 56 pivotally mounted at 57 on the wall 31 in position to swing over the edge of the bracket 38*b*. A pin 58 may be inserted through the yoke 56 and through an opening in the edge of the bracket 38*b* to retain the yoke in place thereover and thus hold the bracket securely.

While the invention has been illustrated and described in certain embodiments, it is recognized that other variations and changes may be made therein without departing from the invention as set forth in the claims.

I claim:

1. A dumping container for a self-loading cargo vehicle having lifting arm units mounted on the vehicle for upward swinging movement relative thereto, said container comprising an elongated body portion having means on opposite ends thereof adapted for engagement by the lifting arm units for elevating the container thereby, brackets adjacent opposite ends of the container adapted to be engaged by a bar connected with the lifting arm units for turning over the container when raised to an elevated position, and means mounting the brackets on the body portion of the container including guideways mounted on the body portion and slide portions on the brackets engaged in the guideways for slidable detachment therefrom.

2. A dumping container for a self-loading cargo vehicle having lifting arm units mounted on the vehicle for upward swinging movement relative thereto, said container comprising an elongated body portion having trunnions extending outwardly from opposite ends thereof adapted for engagement by the lifting arm units for elevating the container thereby, brackets adjacent opposite ends of the container adapted to be engaged by a bar connected with the lifting arm units for turning over the container when raised to an elevated position, means mounting the brackets on the body portion of the container including guideways mounted on the body portion and slide portions on the brackets engaged in the guideways for slidable detachment therefrom, and means for restraining the sliding movement of the brackets with respect to the guideways.

3. A dumping container for a self-loading cargo vehicle having lifting arm units mounted on the vehicle for upward swinging movement relative thereto, said container comprising an elongated body portion having means on opposite ends thereof for engagement by the lifting arm units for elevating the container thereby, brackets adjacent opposite ends of the container adapted to be engaged by a bar connected with the lifting arm units for turning over the container when raised to an elevated position, each of the brackets having a ledge portion thereon with a substantially straight upper surface extending outwardly from the container in position for engagement under the bar upon raising of said lifting arm units, and means mounting the brackets on the body portion for swinging movement to retracted positions with respect thereto.

4. A dumping container for a self-loading cargo vehicle having lifting arm units mounted on the vehicle for upward swinging movement relative thereto, said container comprising an elongated body portion having trunnions extending outwardly from opposite ends thereof adapted for engagement by the lifting arm units for elevating the container thereby, brackets adjacent opposite ends of the container adapted to be engaged by a bar connected with the lifting arm units for turning over the container when raised to an elevated position, each of the brackets having a ledge portion thereon with a substantially straight upper surface extending outwardly from the container in position for engagement under the bar upon raising of said lifting arm units, and means mounting the brackets on the body portion for swinging movement to retracted positions with respect thereto, and means for engaging the brackets in normal positions for holding the brackets against said swinging movement.

5. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom and having an open top for filling and discharge, means on the opposite ends for engagement by the lifting arm units for elevating the container for dumping, and a bracket on one of the side walls having a ledge portion thereon with a substantially straight upper surface extending substantially at right angles to the connected side wall in position for engagement under the dumping bar upon raising of the lifting arm units.

6. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom and having an open top for filling and discharge, trunnions extending outwardly from the opposite ends adapted for engagement by the lifting arm units for elevating the container for dumping, a bracket on one of the side walls having a ledge portion thereon with a substantially straight upper surface extending substantially at right angles to the connected side wall in position for engagement under the dumping bar upon raising of the lifting arm units, and a second surface spaced above said first-mentioned surface in position to overlap said dumping bar and cooperating with said first surface in holding the container thereto during dumping.

7. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom and having an open top for filling and discharge, trunnions extending outwardly from the opposite ends adapted for engagement by the lifting arm units for elevating the container for dumping, a bracket on one of the side walls having a ledge portion thereon with a substantially straight upper surface extending substantially at right angles to the connected side wall in position for engagement under the dumping bar upon raising of the lifting arm units, and means pivoting the bracket to the container wall for swinging said bracket laterally against said wall.

8. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom and having an open top for filling and discharge, trunnions extending outwardly from the opposite ends adapted for engagement by the lifting arm units for elevating the container for dumping, a bracket on one of the side walls having a ledge portion thereon with a substantially straight upper surface extending substantially at right angles to the connected side wall in position for engagement under the dumping bar upon raising of the lifting arm units, and means mounting the bracket on said container wall for bodily removal therefrom.

9. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom and having an open top for filling and discharge, trunnions extending outwardly from the opposite ends adapted for engagement by the lifting arm units for elevating the container for dumping, and a bracket on one of the side walls below the trunnions having a ledge portion thereon with a substantially straight upper surface extending substantially at right angles to the connected side wall in position for engagement under the dumping bar upon raising of the lifting arm units.

10. A container for a self-loading cargo vehicle having lifting arm units mounted on the vehicle for upward swinging movement relative thereto and with a dumping bar extending transversely between the lifting arm units and connected therewith, said container comprising an elongated body having opposite ends and side walls and a bottom, means on the opposite ends adapted for engagement by the lifting arm units for elevating the container for dumping, a bracket on one of the side walls having a ledge portion thereon with a substantially straight upper surface extending substantially at right angles to the connected side wall in position for engagement under the dumping bar upon raising of the lifting arm units, and a second surface spaced above said first-mentioned surface in position to overlap said dumping bar and cooperating with said first surface in holding the container thereto during dumping.

11. A dumping container for a self-loading cargo vehicle having lifting arm units mounted on the vehicle for upward swinging movement relative thereto, said container comprising an elongated body portion having means on opposite ends thereof adapted for engagement by the lifting arm units for elevating the container thereby, brackets adjacent opposite ends of the container adapted to be engaged by a bar connected with the lifting arm units, and means mounting the brackets on the body portion of the container including guideways mounted on the body portion and slide portions on the brackets engaged in the guideways for slidable detachment therefrom.

12. In a self-loading cargo vehicle having lifting arm structure mounted on the vehicle for upward swinging movement relative thereto, said lifting arm structure including a cross member extending transversely of the vehicle at the front thereof in the lowered position of the lifting arm structure, the combination therewith, of a container comprising a body portion having means on opposite sides thereof engaged by the lifting arm structure for elevating the container thereby, and a bracket structure on a side of the container toward the vehicle, said bracket structure having notches therein with the side thereof in overlapping relation with said cross member when the container is supported by the lifting arm structure.

13. In a self-loading cargo vehicle having lifting arm structure mounted on the vehicle for upward swinging movement relative thereto, said lifting arm structure including a cross member extending transversely of the vehicle at the front thereof in the lowered position of the lifting arm structure, the combination therewith, of a container comprising a body portion having means on opposite sides thereof engaged by the lifting arm structure for elevating the container thereby, and brackets on a side of the container toward the vehicle and adjacent opposite ends of said container, said brackets having notches therein with the sides of said notches in overlapping relation with the cross member when the container is supported by the lifting arm structure.

References Cited in the file of this patent

UNITED STATES PATENTS

| | | |
|---|---|---|
| 523,125 | Lebach | July 17, 1894 |
| 612,172 | McKelvey | Oct. 11, 1898 |
| 1,686,607 | Freund et al. | Oct. 9, 1928 |
| 1,758,824 | Coe | May 13, 1930 |
| 2,131,416 | Zetts | Sept. 27, 1938 |
| 2,294,354 | Guignard | Aug. 25, 1942 |
| 2,314,647 | Longenecker | Mar. 23, 1943 |
| 2,456,434 | Manthie | Dec. 14, 1948 |
| 2,470,340 | Cook et al. | May 17, 1949 |
| 2,565,792 | Wagner et al. | Aug. 28, 1951 |
| 2,592,085 | Van Doorne | Apr. 8, 1952 |
| 2,699,876 | Smith | Jan. 18, 1955 |
| 2,707,142 | Jones | Feb. 15, 1955 |

FOREIGN PATENTS

| | | |
|---|---|---|
| 64,200 | France addition | Dec. 21, 1953 |
| 409,488 | France | Feb. 19, 1910 |
| 723,223 | Great Britain | Feb. 2, 1955 |
| 1,079,667 | France | May 19, 1954 |